(12) United States Patent
Dasgupta et al.

(10) Patent No.: US 8,819,158 B2
(45) Date of Patent: *Aug. 26, 2014

(54) JURY SYSTEM FOR USE IN ONLINE ANSWERS ENVIRONMENT

(71) Applicant: Yahoo! Inc., Sunnyvale, CA (US)

(72) Inventors: Anirban Dasgupta, Santa Clara, CA (US); Arpita Ghosh, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/939,114

(22) Filed: Jul. 10, 2013

(65) Prior Publication Data

US 2013/0346322 A1  Dec. 26, 2013

Related U.S. Application Data

(63) Continuation of application No. 11/961,853, filed on Dec. 20, 2007, now Pat. No. 8,510,391.

(51) Int. Cl.
*G06F 15/16* (2006.01)
*G06Q 50/18* (2012.01)
*G06Q 10/00* (2012.01)
*H04L 29/06* (2006.01)

(52) U.S. Cl.
CPC .............. *G06Q 50/182* (2013.01); *G06Q 10/00* (2013.01); *H04L 65/403* (2013.01)
USPC .............. 709/206; 709/224; 709/225; 705/12

(58) Field of Classification Search
CPC ..... H04L 65/403; G06Q 10/00; G06Q 50/182
See application file for complete search history.

(56) References Cited

U.S. PATENT DOCUMENTS

| | | |
|---|---|---|
| 5,895,450 A | 4/1999 | Sloo |
| 6,064,978 A | 5/2000 | Gardner et al. |
| 2002/0097267 A1 | 7/2002 | Dinan et al. |
| 2003/0216962 A1 * | 11/2003 | Heller et al. .......... 705/14 |
| 2005/0071284 A1 | 3/2005 | Courson et al. |
| 2005/0071433 A1 | 3/2005 | Shah |
| 2005/0149567 A1 | 7/2005 | Levin et al. |
| 2005/0159970 A1 | 7/2005 | Buyukkokten et al. |
| 2006/0123338 A1 | 6/2006 | McCaffrey et al. |
| 2007/0112607 A1 | 5/2007 | Tien et al. |
| 2007/0162544 A1 | 7/2007 | Rosenbaum |
| 2008/0010081 A1 | 1/2008 | Christopher |
| 2008/0133747 A1 * | 6/2008 | Fish .................. 709/224 |
| 2008/0140683 A1 | 6/2008 | Hanif et al. |

OTHER PUBLICATIONS

PCT/US2008/0869945 International Search Report and Written Opinion of the International Search Authority, Jun. 19, 2009, 7 pages.
PCT/US2008/0869945, pending claims, Jun. 2009, 4 pages.

* cited by examiner

*Primary Examiner* — Thomas Dailey
*Assistant Examiner* — Nam Tran
(74) *Attorney, Agent, or Firm* — Hickman Palermo Truong Becker Bingham Wong LLP; Karl T. Rees

(57) ABSTRACT

A system for resolving disputes in an online answers community is disclosed. The system improves the system's ability to resolve reports of abuse.

20 Claims, 3 Drawing Sheets

JURY SYSTEM FOR USE IN ONLINE ANSWERS ENVIRONMENT

CROSS-REFERENCE TO RELATED APPLICATIONS; BENEFIT CLAIM

This application is a Continuation of U.S. patent application Ser. No. 11/961,853, filed Dec. 20, 2007, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).]

FIELD OF THE INVENTION

The present invention relates to a system for resolving disputes, including but not limited to within an online answers community. More particularly, the system improves the (content provider's existing) system's ability to resolve reports of disputes.

BACKGROUND

Content providers sometimes provide online "answers" communities where people can seek information and opinions on various topics. Within an answers community, users understand that they rely upon information obtained therein at their own risk. For such a community to be effective, it is important to screen out bad behavior such as flaming, spamming, abusive language, and pornographic references. Such behavior can result in abuse reports.

There can be a large number of users in such a community, thereby giving rise to a high volume of user activity therein. High volumes of user activity can give rise to high volumes of abuse reports. However, abuse reports must also be verified for accuracy, so as to prevent an innocent candidate from being needlessly reprimanded or banned from the community.

One way to properly manage abuse reports is for all abuse reports to be handled by a customer care division of the content provider. A customer care division can investigate each report and decides what action should be taken for the report content. However, such investigations and actions can be time-consuming. Consequently, a mechanism for resolving disputes in an online community, including but not limited to an answers community, is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A content provider employs a system for improving the process of dealing with abuse reports within a community, such as an online answers community. The system provides a community-based jury mechanism which resolves some of the abuse reports, without needing to engage the staff of the content provider.

Explanation of System

Figure 1:
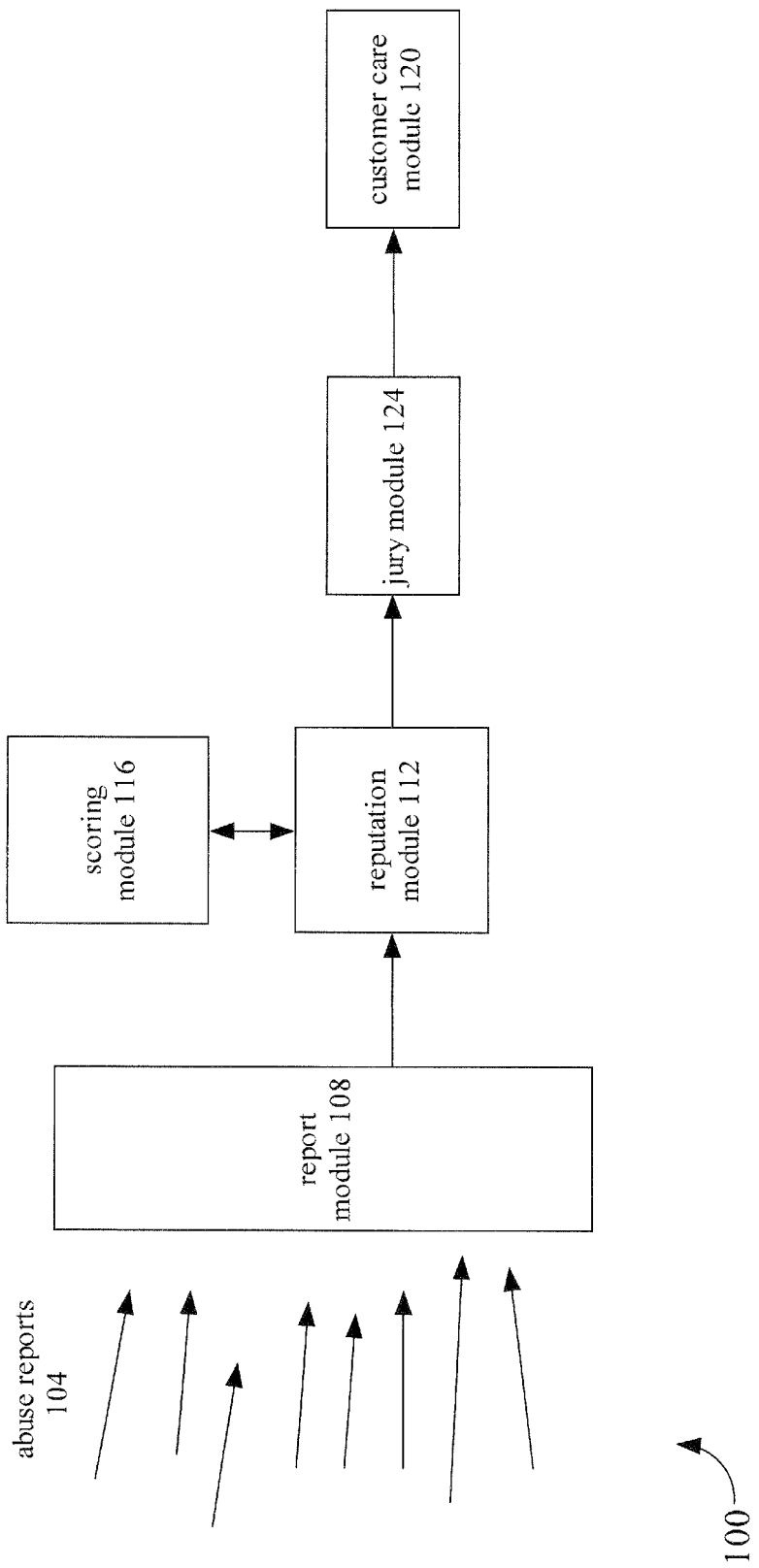
FIG. 1 is a block diagram that illustrates an example system for managing appeals in an online community, according to an embodiment of the invention.

There can be numerous types of undesirable content within an online community, such as an online answers community. One type of undesirable content might be spam, while another type might be content that is offensive, defamatory, or pornographic. To resolve these and other issues, FIG. 1 shows a system 100 for resolving abuse reports within an online community. One type of online community could be an online answers community, although the system 100 could also be utilized within other types of online communities. The system 100 works within any community of users that can upload viewable content which can be viewable by other members, including not just answers but also for example online gaming.

The system 100 tracks abuse reports 104 from various users. The system 100 also can automatically sense various forms of unwanted content, such as photographs, specific text terms, and audio files. A report module 108 initially receives the abuse reports 104.

FIG. 1 also shows a reputation module 112 connected to a scoring module 116, and a customer care module 120 connected to a jury module 124. The reputation module assists in measuring the reputations of users, and works in conjunction with the scoring module 116. The jury module 124 uses the information from the reputation module 112 to assist users that wish to become jurors. Abuse reports that are too close to decide can be referred to the customer care module 120, in which a staff of individuals review the abuse reports.

The reputation module 112 is stored within the report module 108, which handles abuse reports. The reputation module 112 takes information from the scoring module 116 which tracks the activities and other data regarding the various users. To make an initial decision as to whether to forward the issue onto the next level, the reputation module 112 calculates a reputation score of both a "plaintiff" (the user which reported the potential abuse) and the "defendant" (the user which is accused of inputting the potential abuse). This reputation score includes information such as how often a user logs on, how reliable that user's input has been in the past, and whether other abuse reports have been filed against that user.

Any decision made by the reputation module 112 includes some factoring of the reputation scores of both plaintiff and defendant. For example, the higher the reputation score of the plaintiff, or the lower the reputation of the defendant, the more likely is it that the decision made is adverse to the defendant. Assuming a decision adverse to the defendant is produced by the reputation module 112, a defendant can still appeal the result from the reputation module 112. Appeals are passed onto the jury module 124 for resolution. If the jury module 124 cannot decide, the appeal is then referred to the customer care division 120 which, as stated previously, is staffed by the content provider. Reducing the number of appeals that customer care division 120 must review can reduce labor costs and time. The system 100 achieves reductions by performing community-based screening using the jury module 124, which may reduce a substantial portion of appeals.

Jury Module

The jury module 124 selects "jurors" for resolving the appeal. As part of the selection process, the jury module 124 uses the reputation module 112 to screen out users with a below-average reputation, users whose rate of login is below a certain threshold, and users who have served on a jury recently.

A user's reputation as a potential juror can be measured by a variety of means, including but not limited to the amount of interaction of that user with the others in the community, how often a user logs in ("login rate"), and feedback provided by other users. To measure a reputation, the scoring module 116 uses a machine-learning based evaluation of the content that the user contributed to the system 100. Such an evaluation includes determining whether the questions/answers contributed by that user are spam or not. Other ways of measuring a user's reputation can include tallying responses to the question "did this user's input help you", "did this review help you", or other similar inquiry. Additional ways of measuring a user's reputation can include how much agreement that user had with majority (or customer service) decisions in the previous jury participations.

Within the jury module 124, the threshold of the login rate to determine eligibility to serve as a juror is adjustable. A higher threshold of login-rate ensures only choosing users likely to see the jury communications within a very short time interval, thus ensuring that the appeal be resolved by the jury module 124 within a shorter time. However, a higher threshold also reduces the amount of possible people who could be chosen as jurors. The actual thresholds can be determined by tracking the number of juror appeals required, the distribution of login-rate among users, and a desired goal of time to resolve each appeal.

The jury module 124 will also screen users to ensure that users are considered only for those appeals which involve defendants that the users have no relationship with, as decided according to the implicit user-user graph considering all action in the system such as voting and answering. The system 100 can choose jurors using, for example, a random sampling from users who have never interacted with any of the parties in dispute and who have the required login rate.

Selection of Jurors

Potential jurors can be selected as follows. Appeals to be resolved will be held in a common pool of pending items. Every time a user logs in, the system 100 will check if s/he is eligible for serving as a juror for one of the appeals within the pool. If eligible, the system 100 will present that potential juror a subset of those appeals.

The subset of appeals to be presented to the potential juror means if there were, for example, one hundred issues pending to be resolved, for each possible juror, the system 100 could be set up to only display a predetermined threshold of appeals, for example two. The exact numbers of course depend on the parameters of the system, which can be adjusted and tuned according to desired performance. To participate and become a juror, a user must opt-in using for example an onscreen check-box or other user-selectable indicator, and then go on to read the appeal and the guidelines.

Example of Operation

Figure 2:
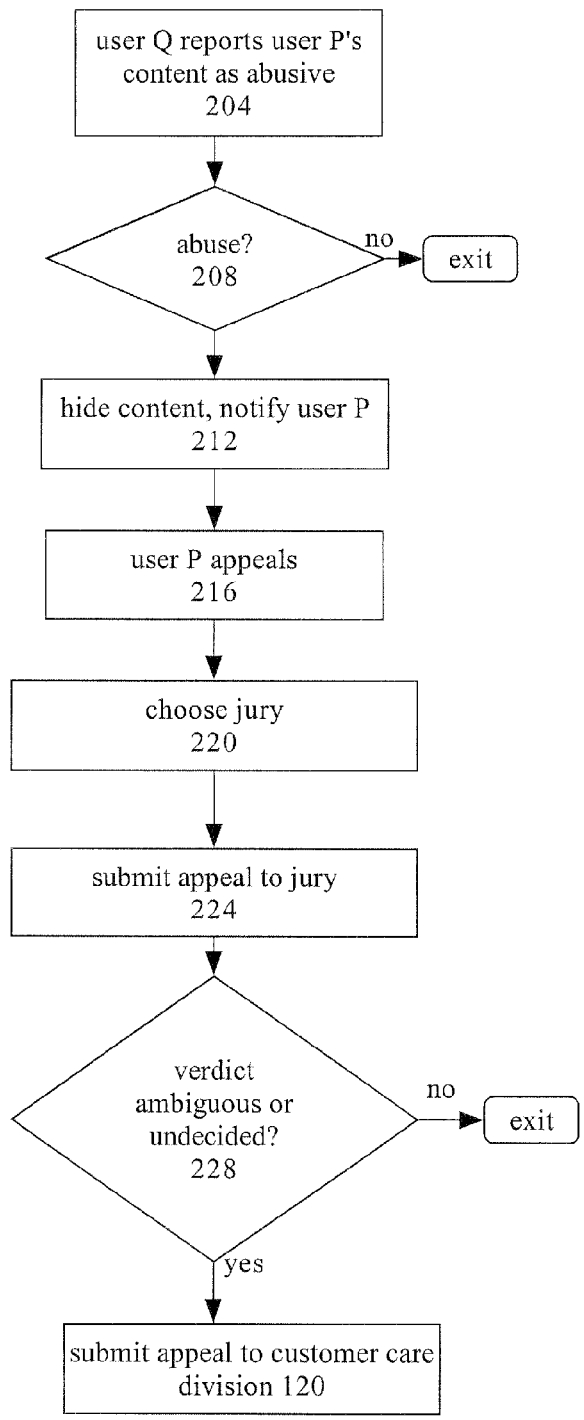
FIG. 2 is a flowchart showing an example use of the system, according to an embodiment of the invention.

FIG. 2 is a flowchart demonstrating an example usage of the system 100. At step 204, a user Q reports a user P's content as abusive. At step 208, the reputation system 112 makes an initial judgment whether or not P's content truly represents a potential abuse. If P's content is determined to be potential abuse, at step 212 the system 100 hides the content from other users, and then notifies user P.

At step 216, user P appeals the determination. At step 220, a jury is chosen. At step 224, the appeal is submitted to a set of jurors chosen from the community. At step 228, a jury determination is made. If the jury decision is conclusive (for example >=80% agreement), the content is either made visible or kept hidden. If the jury decision is undecided (for example <=80% agreement), the determination is sent to the customer care division 120.

The size of a jury can be related to the reputations of the plaintiff and defendant. Where the respective reputations are close, a larger jury can be used in order to get a more accurate sampling. One potential threshold can be to have at least three members who actually provide input to the jury decision, although other thresholds can also be used. The system 100 strives to stay between unanimous and simple majority, to for example keep a safe margin for errors, for instance 75%.

The system 100 is structured to achieve turnaround within a single day, where possible. Each time the jurors login into the system, they are shown a box with the remaining time to respond. Whether they receive emails or IMs could depend on the initial user agreements that they sign.

An agreement among the verdicts of the jurors can be used to prioritize abuse reports for attention by the customer care module 120, which may be staffed by human reviewers. Verdicts with strong agreement can be considered final and not forwarded to the customer care division 120, or granted a lower priority therein. Meanwhile, verdicts with is no strong consensus can receive higher priority from the customer care division 120.

Using the system 100, the online answers community 102 can self-moderate abuses. Also, the content provider can achieve reduced complaints, yet also reduce its own workload.

User-User Graph

As a way of illustrating the juror selection process, suppose that users A, B, C and D are being considered for use as potential jurors. Now suppose A answered a question that has been put forward by B. Now suppose C rates that answer, and at the same time answers a question from D. A user-user graph could be formed from this data having various edges or data points. Such a juror-juror graph would look like the following. The edges (salient data points) in this graph would be (A,B), (C, A), (C,B), and (C,D).

The specific categories of actions which are deemed as interactions are also adjustable. For example, answering a question indicates more interaction than rating a response. Accordingly, if only question-answering is considered to be an action, then the only edges will be (A, B) and (C, D).

Users that opt-in can be rewarded with points or other types of reward mechanisms. Thus, honestly reporting their evaluations will be a good strategy. This in turn leads to users being highlighted in various community boards displayed on the websites, e.g. "top 100 reviewers", "top reviewer of the week", "experts of this year", or other designations. Such public recognition can be incentive for users to act as jurors.

It is also possible to allow cooperative jurors to use the points accumulated as a currency across various other product offerings of the content provider.

Hardware Overview

Figure 3:
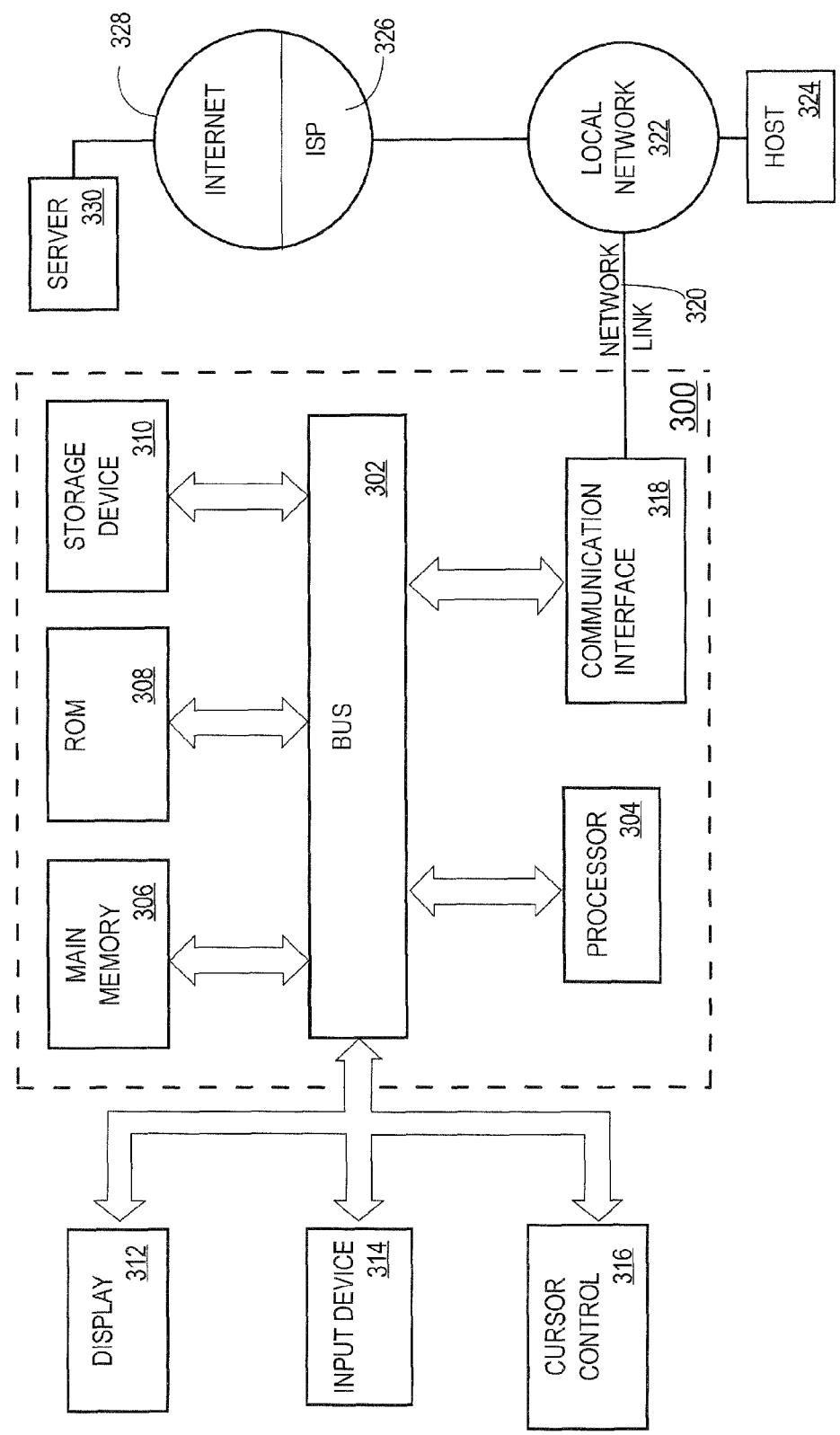
FIG. 3 shows a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a computer.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Example Embodiments

In an embodiment, a method comprises: in response to an indication that content provided by a particular member of an online community is potentially improper, automatically sending one or more invitations to invite a plurality of juror candidates to express an opinion about whether the content is proper; from said plurality of juror candidates, establishing a plurality of members of the online community to be jurors to determine whether said content is proper; based on input received from one or more of said jurors, selecting a manner of responding to said content; and responding to said content in the manner that was selected based on said input.

In an embodiment, the step of automatically sending one or more invitations includes detecting a whether a user is logged in or not. In an embodiment, the method further comprises in response to determining that a user is logged in, determining the qualifications of the user. In an embodiment, the method further comprises: upon determining that the qualifications of the user are within a predetermined threshold, sending an invitation to express the opinion. In an embodiment, the step of expressing an opinion is in the form of a slider. In an embodiment, the step of expressing an opinion is in the form of a text-box.

In an embodiment, the indication is a notification of potential abuse. In an embodiment, the steps of selecting a plurality of jurors and sending to each juror an invitation are performed automatically after performing the steps of: obtaining reputation information regarding a user that submitted the notification of potential abuse; and based on the reputation information, determining whether the notification of potential abuse should be escalated.

In an embodiment, the method further comprises: selecting a subset of the jury pool for reviewing the notification of potentially improper content; presenting details about the notification of potentially improper content to the subset; and obtaining a verdict. In an embodiment, the method further comprises removing the abuse and admonishing the user that was responsible for loading the improper content. In an embodiment, the method further comprises notifying the user responsible for loading the potentially improper content of the verdict finding that the content was found to not be improper.

In an embodiment, the method further comprises if the verdict is ambiguous, forwarding the details to a customer care module. In an embodiment, the method is performed within an online answers community.

In an embodiment, a method comprises: sending one or more invitations to invite a plurality of juror candidates to express an opinion in the future about whether a particular content item is proper; and from said plurality of juror candidates, establishing a plurality of members of the online community to be jurors to determine in the future whether said particular content is proper. In an embodiment, the method further comprises receiving a notification of a specific instance of potentially improper content; based on input received from one or more of said jurors, selecting a manner of responding to the specific instance of the potentially improper content; and responding to said potentially improper content in the manner that was selected based on said input.

In an embodiment, the step of automatically sending one or more invitations includes detecting a whether a user is logged in or not. In an embodiment, the method further comprises, in response to determining that a user is logged in, determining the qualifications of the user. In an embodiment, the method further comprises, upon determining that the qualifications of the user are within a predetermined threshold, sending an invitation to express the opinion. In an embodiment, the step of expressing the opinion is in the form of a slider. In an embodiment, the step of expressing the opinion is in the form of a text-box.

In an embodiment, the steps of selecting a plurality of jurors and sending to each juror an invitation are performed automatically after performing the steps of: obtaining reputation information regarding a user that submitted the notification of potential abuse; and based on the reputation information, determining whether the notification of potential improper conduct should be escalated.

In an embodiment, the method further comprises: selecting a subset of the jury pool for reviewing the notification of potentially improper content; presenting details about the notification of potentially improper content to the subset; and obtaining a verdict. In an embodiment, the method further comprises, if the verdict is ambiguous, forwarding the details to a customer care module.

In an embodiment, a system for managing reports of abuses in an online answers community comprises: a report module for receiving a plurality of reports of potential abuses; a reputation module connected to the report module, for determining the reputations of both the reporter (plaintiff) and the reportee (defendant) and making an initial decision of a report of potential abuse; a scoring module connected to the reputation module, for performing calculations to obtain a reputation score of both the plaintiff and the defendant, respectively; a customer care division for receiving appeals from a defendant that obtained an adverse decision from the reputation module; and a jury module for determining the accuracy of the reports.

We claim:

1. A system of one or more computing devices, comprising:
one or more processors,
one or more memories coupled to the one or more processors;
wherein the one or more processors, in conjunction with the one or more memories, are configured to implement steps, the steps comprising:
receiving, at an online community component, content uploaded by members of an online community;
calculating, at a reputation module that is coupled to the online community component, reputation scores for the members of the online community, the reputation scores representing perceived values of contributions from corresponding members to the online community;
receiving, at a report module that is coupled to the online community component, from reporting members of the online community, reports of bad behavior by particular members of the online community;
selecting, at a juror selection module that is coupled to the report module and the reputation module, subsets of the members of the online community to be juror candidates for resolving particular reports received by the report module, the subsets selected based at least in part on particular reputation scores calculated by the reputation module;

inviting, at an invitation module that is coupled to the juror selection module, particular juror candidates to provide input concerning one or more of the reports;

receiving, at a juror input module, inputs from at least some of the juror candidates concerning at least some of the reports;

determining, at a report response module that is coupled to the juror input module and the report module, manners of responding to the reports based at least in part on the juror input module.

2. The system of claim 1, wherein the steps further comprise calculating, at the reputation module, particular reputation scores for certain members based at least partially upon a measure of agreement between previous juror input received by the juror input module from the certain members concerning particular reports and responses selected by the report response module for the particular reports.

3. The system of claim 1, wherein the steps further comprise, at the reputation module, improving one or more reputation scores for the one or more jurors in response to receiving input via the juror input module.

4. The system of claim 1, wherein the steps further comprise, at the juror selection module, selecting certain members of the online community to be part of a particular group of juror candidates based at least in part on whether the certain members are logged in to the online community component at the time the particular group is selected.

5. The system of claim 1, wherein the steps further comprise, at the juror selection module, selecting certain members of the online community to be juror candidates based at least in part on login frequencies for the certain members.

6. The system of claim 1, wherein the steps further comprise, at the juror selection module, selecting certain members of the online community to be juror candidates for a particular report, filed by a first member and concerning a second member, only if those certain members have not previously been involved in one or more types of interactions with the first member or the second member.

7. The system of claim 1, wherein the steps further comprise, at the juror selection module, selecting certain members of the online community to be juror candidates based at least in part on how recently the certain members last provided input via the juror input module.

8. The system of claim 1, wherein the steps further comprise, at the juror selection module, selecting certain members of the online community to be juror candidates based at least in part on one or more reputation scores associated with the certain members.

9. The system of claim 1, wherein the steps further comprise, at the juror selection module, determining how many members to select for a particular group of jurors based at least on one or more reputation scores for one or both of: a first member of the online community that submitted content concerning which the report was received and a second member of the online community who initiated the report.

10. The system of claim 9, wherein the steps further comprise, at the juror selection module, determininq how many members to select based on a measure of closeness between a first reputation score for the first member and a second reputation score for the second member.

11. The system of claim 1, wherein the steps further comprise:

at a review component, determininq measures of agreement in input received for certain reports by the juror input module, and, based on the measures of agreement, determininq priority levels and/or timeframes for reviewing selected manners of responding to the certain reports.

12. The system of claim 1, wherein the steps further comprise:

at a review component determining measures of agreement in input received for certain reports by the juror input module, and, based on the measures of agreement, determining whether to forward to reviewers the certain reports and corresponding selected manners of response determined by the report response module.

13. The system of claim 1, wherein the steps further comprise presenting, at the juror input module, responsive to the invitations, juror input interfaces to the juror candidates, the juror input interfaces configured to display information about particular reports, the juror input interfaces further configured to facilitate the at least some of the members providing the inputs concerning the at least some of the reports.

14. The system of claim 1, wherein the steps further comprise, at the invitation module, inviting the particular juror candidates to provide the inputs in response to the particular juror candidates logging in to the online community.

15. The system of claim 1, wherein the steps further comprise:

pooling reports until threshold amounts of inputs have been received concerning the reports via the jury response module and/or until threshold amounts of time have lapsed;

inviting the particular juror candidates to provide the inputs in response to the particular juror candidates logging in to the online community;

at the juror selection module, selecting, from the pool, based in part on the identity of a given juror candidate who has elected to provide input in response to an invitation from the invitation module, one or more reports concerning which to solicit input from the given juror candidate.

16. The system of claim 1, wherein the steps further comprise:

pooling reports until threshold amounts of inputs have been received concerning the reports via the jury response module and/or until threshold amounts of time have lapsed;

soliciting input from a particular juror candidate concerning a plurality of reports selected from the pool by the juror selection module.

17. The system of claim 1, wherein the steps further comprise, at the invitation module sending emails or instant messages to the particular juror candidates requesting that they to provide the inputs.

18. The system of claim 1, wherein the steps further comprise, at the juror input module displaying particular juror candidates amounts of time remaining for providing certain inputs concerning certain reports.

19. The system of claim 1, wherein the steps further comprise, at the juror selection module selecting the juror candidates in part by determining, when a given member logs into the online community, whether to select the member as a juror candidate based in part on whether the member is eligible to provide juror input for at least one of the reports for which juror input is still needed.

20. The system of claim 1, wherein the steps further comprise, at the online community component, awarding the members based on the reputation scores.

* * * * *